United States Patent
Maniloff et al.

(10) Patent No.: US 12,107,629 B2
(45) Date of Patent: Oct. 1, 2024

(54) OPTICAL DELAY CALIBRATION OF OPTICAL MODULES

(71) Applicant: Ciena Corporation, Hanover, MD (US)

(72) Inventors: Eric S. Maniloff, Woodlawn (CA); Sebastien Gareau, Ottawa (CA); Benard J. Rhody, Ottawa (CA)

(73) Assignee: Ciena Corporation, Hanover, MD (US)

( * ) Notice: Subject to any disclaimer, the term of this patent is extended or adjusted under 35 U.S.C. 154(b) by 120 days.

(21) Appl. No.: 18/087,004

(22) Filed: Dec. 22, 2022

(65) Prior Publication Data

US 2024/0214074 A1 Jun. 27, 2024

(51) Int. Cl.
*H04B 10/43* (2013.01)
*H04B 10/524* (2013.01)

(52) U.S. Cl.
CPC .......... *H04B 10/43* (2013.01); *H04B 10/524* (2013.01)

(58) Field of Classification Search
CPC .. H04B 10/43; H04B 10/524; H04B 10/0775; H04B 10/07; H04B 10/035; H04B 17/00; H04B 17/10; H04B 10/60; H04B 10/40; H04B 10/50; H04B 10/0795; H04B 10/0799; G01B 9/02069; H04L 43/0852; H04L 43/0864; H04L 43/0858; H04L 43/50; H04J 3/065
See application file for complete search history.

(56) References Cited

U.S. PATENT DOCUMENTS

| | | | |
|---|---|---|---|
| 8,699,880 B2 | 4/2014 | Grigoryan | |
| 9,515,767 B2 | 12/2016 | Frankel et al. | |
| 10,396,891 B2 | 8/2019 | Maniloff et al. | |
| 10,396,972 B1 * | 8/2019 | Gareau | H04J 3/065 |
| 10,439,726 B1 | 10/2019 | Mazzini et al. | |
| 2005/0196171 A1 | 9/2005 | Dybesetter et al. | |
| 2006/0051099 A1 | 3/2006 | Ekkisogloy et al. | |
| 2006/0093286 A1 | 5/2006 | Dybsetter et al. | |
| 2006/0093363 A1 | 5/2006 | Dybsetter et al. | |
| 2006/0147216 A1 | 7/2006 | Dybsetter et al. | |
| 2006/0153569 A1 | 7/2006 | Dybsetter et al. | |

(Continued)

FOREIGN PATENT DOCUMENTS

JP 2004112267 A 4/2004

OTHER PUBLICATIONS

CFP MSA, CFP MSA Management Interface Specification, 100/40 Gigabit Transceiver Package Multi-Source Agreement, Version 2.6 r06a, Mar. 24, 2017, pp. 1-169.

(Continued)

*Primary Examiner* — Hibret A Woldekidan
(74) *Attorney, Agent, or Firm* — Baratta Law PLLC; Lawrence A. Baratta, Jr.

(57) ABSTRACT

An optical module includes a transmitter assembly; a receiver assembly; and circuitry connected to the transmitter assembly and the receiver assembly, wherein the circuity is configured to, responsive to a test of delay in one or more of the transmitter assembly and the receiver assembly, store a delay value for one or more of the transmitter assembly and the receiver assembly, and, responsive to a query of the delay, provide the stored delay value for each of the transmitter assembly and the receiver assembly. The circuitry can be further configured to perform the test of delay via inserting an event that is used for timing detection at a corresponding receiver assembly.

12 Claims, 3 Drawing Sheets

(56) References Cited

U.S. PATENT DOCUMENTS

| | | |
|---|---|---|
| 2006/0153570 A1 | 7/2006 | Nelson et al. |
| 2006/0159461 A1 | 7/2006 | Nelson et al. |
| 2006/0215545 A1 | 9/2006 | Nelson |
| 2006/0216040 A1 | 9/2006 | Nelson et al. |
| 2007/0065151 A1 | 3/2007 | Dybsetter et al. |
| 2007/0168679 A1 | 7/2007 | Ekkizogloy et al. |
| 2007/0196104 A1 | 8/2007 | Nelson et al. |
| 2009/0168858 A1 | 7/2009 | Luo |
| 2009/0182531 A1 | 7/2009 | Ekkizogloy et al. |
| 2012/0301134 A1 | 11/2012 | Davari et al. |
| 2013/0077968 A1 | 3/2013 | Yang |
| 2013/0129347 A1* | 5/2013 | Shin .................. H04B 10/0775 398/25 |
| 2013/0182585 A1 | 7/2013 | Chaudhary et al. |
| 2013/0322872 A1* | 12/2013 | Jobert .................. H04B 10/07 398/25 |
| 2014/0024255 A1 | 1/2014 | Robitaille et al. |
| 2014/0270773 A1 | 9/2014 | Elmoalem et al. |
| 2015/0086211 A1 | 3/2015 | Coffey et al. |
| 2017/0207849 A1 | 7/2017 | Sinclair et al. |
| 2018/0048391 A1 | 2/2018 | Tanaka et al. |
| 2019/0326992 A1 | 10/2019 | Charlton et al. |
| 2020/0007471 A1 | 1/2020 | Estabrooks et al. |
| 2020/0145106 A1 | 5/2020 | Mazzini et al. |

OTHER PUBLICATIONS

CFP MSA, CFP2 Hardware Specification, Revision 1.0, Jul. 31, 2013, pp. 1-64.

CFP MSA, CFP4 Hardware Specification, Revision 1.1, Mar. 18, 2015, pp. 1-34.

CFP MSA, CFP8 Hardware Specification, Revision 1.0, Mar. 17, 2017, pp. 1-49.

CFP MSA, Hardware Specification, Revision 1.4, Jun. 7, 2010, pp. 1-53.

OIF, IA OIF-C-CMIS-01.0, Implementation Agreement for Coherent CMIS, Jan. 14, 2020, pp. 1-34.

OSFP MSA, OSFP Octal Small Form Factor Pluggable Module, Rev 3.0, Mar. 14, 2020, pp. 1-99.

Common Management Interface Specification, Published Rev 4.0, May 8, 2019, pp. 1-265.

QSFP-DD MSA, QSFP-DD Hardware Specification for QSFP Double Density 8X Pluggable Transceiver Rev 5.0, Jul. 9, 2019, pp. 1-82.

Apr. 30, 2024, International Search Report and Written Opinion for International Patent Application No. PCT/US2023/085387.

* cited by examiner

OPTICAL DELAY CALIBRATION OF OPTICAL MODULES

FIELD OF THE DISCLOSURE

The present disclosure relates generally to networking and computing. More particularly, the present disclosure relates to systems and methods for optical delay calibration of optical modules, including pluggable optical modules.

BACKGROUND OF THE DISCLOSURE

In optical networking, optical interfaces can be realized through pluggable optical modules (also referred to as pluggable modules, pluggable transceivers, plugs, or simply "modules," etc.). The pluggable optical modules can be defined/standardized via Multisource Agreements (MSAs), such as, without limitation, Small Form-factor Pluggable (SFP), 10 Gigabit small Form-factor Pluggable (XFP), Quad SFP (QSFP) and variants thereof, Octal SFP (OSFP) and variants thereof, C Form-factor Pluggable (CFP) and variants thereof, Digital Coherent Optics (DCO), 400ZR, Consortium for On-Board Optics (COBO), etc. Of course, pluggable optical modules can also be proprietary vendor implementations as well. Additionally, new MSAs and the like are continually emerging to address new services, applications, and advanced technology. Standardization allows multiple vendors to design and supply pluggable optical modules reducing risk for vendors and operators, increasing flexibility, and accelerating the introduction of new technology. The standards define the pluggable optical module's mechanical characteristics, management interfaces, electrical characteristics, optical characteristics, power consumption, and thermal requirements. In use, pluggable optical modules are used by networking hardware, such as switches, routers, etc., to provide optical interconnect. Note, as described herein, the terms "optical module," "coherent optical module," "coherent module," "pluggable module," "coherent pluggable module," and variations thereof are all equivalent, and can merely be referred to as an optical module or simply a module. Also, the present disclosure relates to any optical module or module, whether pluggable or not (e.g., an optical sub-assembly).

From a management perspective, for example, the IA OIF-C-CMIS-01.0 "Implementation Agreement for Coherent CMIS," Jan. 14, 2020, from the Optical Internetworking Forum, the contents of which are incorporated by reference herein, defines management interfaces for 400ZR modules and future 800ZR modules. The Common Management Interface Specification (CMIS), Rev. 4.0, May 8, 2019, from the QSFP-DD MSA Group, the contents of which are incorporated by reference herein, defines a management communication based on a Two-Wire-Interface (TWI), for QSFP Double Density (QSFP-DD), OSFP, COBO, QSFP, and SFP-DD. QSFP-DD modules are defined in the QSFP-DD Hardware Specification for QSFP DOUBLE DENSITY 8×PLUGGABLE TRANSCEIVER, Rev 5.0, Jul. 9, 2019, the contents of which are incorporated by reference.

Coherent optical modules, including pluggable optical modules, are starting to get deployed in applications towards the edge of the network that are sensitive to delay uncertainty. In these applications, mostly related to mobile/wireless (e.g., 5G), delay uncertainty translates to time transfer error and the applications have a certain tolerance to this time error. There are certain "Classes" of acceptable time error defined, that network equipment must adhere to. For example, Class A is ±50 ns, Class B is ±20 ns, Class C is ±10 ns, Class D is discussing single ns. The Classes are associated to the network element (NE), and components within the NE (e.g., a coherent optical module) get a portion of this budget.

There have been previous disclosures, e.g., U.S. Pat. No. 10,594,395, "Systems and methods for compensating coherent optics delay asymmetry in a packet optical network," issued Mar. 17, 2020, and U.S. Pat. No. 10,313,103, "Systems and methods for precise time synchronization with optical module," issued Jun. 4, 2019, the contents of both are incorporated by reference in their entirety. These focus on performing timing transfer using the coherent modem itself, e.g., Precision Time Protocol (PTP) over Optical Transport Network (OTN). This is one way to address the issue; however, it is more challenging to operationalize for pure Ethernet/IP switching/routing products. Some applications want to leverage module latency reporting to minimize the time error introduced by the coherent module and perform the timing transfer at the Ethernet/IP layer.

There are two main sources of latency uncertainty (which translates to time error) in optical modules. The first source of delay uncertainty relates to the protocol processes, delay elements (First-In-First-Outs (FIFOs)), Serializer-Deserializer (SERDES), and the like. The second source of delay uncertainty in coherent optical modules is related to the actual optical assembly (Receiver Optical Subassembly (ROSA)/Transmitter Optical Subassembly (TOSA)) found inside the module, and this is the scope of this disclosure.

A coherent optical module can contain various components (splitters, Variable Optical Attenuators (VOAs), Tunable Optical Filter (TOF), and the like) however the main source of delay uncertainty is often found in the Erbium-Doped Fiber Amplifier (EDFA) (optical amplifier), given that these are built from doped fiber spools. The fiber spools have a certain length tolerance measured in meters. Previous measurements have shown that this uncertainty can be significant (e.g., on the order of nanoseconds) and makes meeting certain application Classes quite challenging.

BRIEF SUMMARY OF THE DISCLOSURE

Again, the present disclosure relates to systems and methods for optical delay calibration of optical modules, including pluggable optical modules as well as non-pluggable optical modules or components. This disclosure covers novel approaches to calibrate and factor out optical assembly (ROSA/TOSA) delay uncertainties. Once the transmitter and receiver optical assembly delays are known and stored during manufacturing processes, they can then be added to the protocol/digital (dynamically measured) delays and reported at the full module level.

In an embodiment, an optical module includes a transmitter assembly; a receiver assembly; and circuitry connected to the transmitter assembly and the receiver assembly, wherein the circuity is configured to, responsive to a test of delay in each of the transmitter assembly and the receiver assembly, store a delay value for one or more of the transmitter assembly and the receiver assembly, and, responsive to a query of the delay, provide the stored delay value for the one or more of the transmitter and the receiver assemblies. The circuitry can be further configured to perform the test of delay via inserting an event that is used for timing detection at a corresponding receiver assembly. The event can be one or more of a Digital Signal Processor (DSP) symbol, a signal in a digital protocol layer, and a test pattern. The corresponding receiver assembly can be the receiver assembly in a loopback configuration. The delay value for each of the transmitter assembly and the receiver assembly can be determined by separating an overall delay in the loopback configuration based on a predetermined split. The corresponding receiver assembly can be a receiver assembly in a second optical module having known delay values that are made available to the optical module. The optical module and the second optical module can be synchronized to one another via an embedded pulse per second (ePPS). The test of delay can be performed with an external test set. The optical delay can be due to one or more components including splitters, Variable Optical Attenuators (VOAs), Tunable Optical Filters (TOFs), optical amplifiers, and internal fibers interconnecting the one or more components. The stored delay value for each of the transmitter assembly and the receiver assembly can be in registers associated with the circuitry.

In another embodiment, a method includes steps of, responsive to a test of delay in each of a transmitter assembly and a receiver assembly associated with an optical module, storing a delay value for one or more of the transmitter assembly and the receiver assembly; and, responsive to a query of the module delay, providing the stored delay value for one or more of the transmitter assembly and the receiver assembly. The steps can further include perform the test of delay via inserting an event that is used for timing detection at a corresponding receiver assembly. The event can be one or more of a Digital Signal Processor (DSP) symbol, a signal in a digital protocol layer, and a test pattern. The corresponding receiver assembly can be the receiver assembly in a loopback configuration. The delay value for each of the transmitter assembly and the receiver assembly can be determined by separating a combined delay in the loopback configuration based on a predetermined split. The corresponding receiver assembly can be a receiver assembly in a second optical module having known delay values that are made available to the optical module. The optical module and the second optical module can be synchronized to one another via an embedded pulse per second (ePPS). The test of delay can be performed with an external test set. The optical delay can be due to one or more components including splitters, Variable Optical Attenuators (VOAs), Tunable Optical Filters (TOFs), optical amplifiers, and internal fibers interconnecting the one or more components. The stored delay value for each of the transmitter assembly and the receiver assembly can be in registers associated with the circuitry.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for optical delay calibration of optical modules, including pluggable optical modules as well as non-pluggable optical modules or components. This disclosure covers novel approaches to calibrate and factor out optical assembly (ROSA/TOSA) delay uncertainties. Once the transmitter and receiver optical assembly delays are known and stored during manufacturing processes, they can then be added to the protocol/digital (dynamically measured) delays and reported as a value encompassing the full module. The present disclosure includes (i) Storing of transmit and receive path optical parameters, such as in module non-volatile memory, to be used in computation of module latency reporting values in standard CMIS registers or the like.

(ii) Required hooks, that will be incorporated into the module (design) that will facilitate optical measurement delays (during manufacturing process). These hooks are circuitry or the like to perform the measurements.

(iii) One (or more) delay measurement procedures (used during manufacturing process) and leveraging the hooks (as in (ii) above) and storing the measured optical delays in the standard registers (as in (i) above).

Optical Module

Figure 1:
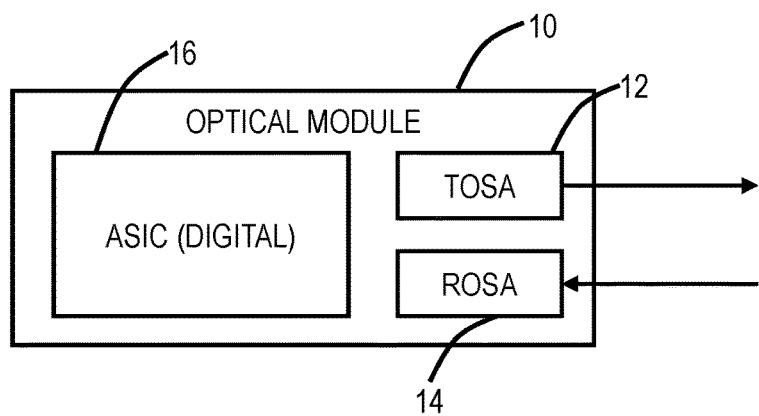
FIG. 1 is a block diagram of a pluggable module.

FIG. 1 is a block diagram of an optical module 10. For simplicity of illustration, the optical module 10 includes a transmitter assembly 12 (TOSA 12), a receiver assembly 14 (ROSA 14), and circuitry 16, such as an ASIC 16, DSP 16, etc. Again, in an embodiment, the optical module 10 is one of a Small Form-factor Pluggable (SFP), 10 Gigabit small Form-factor Pluggable (XFP), Quad SFP (QSFP) and variants thereof, Octal SFP (OSFP) and variants thereof, C Form-factor Pluggable (CFP) and variants thereof, Digital Coherent Optics (DCO), 400ZR, Consortium for On-Board Optics (COBO), etc. In another embodiment, the optical module 10 can be a proprietary module. In a further embodiment, the optical module 10 can be another type of pluggable module, a fixed module, and the like.

Those skilled in the art will recognize the present disclosure contemplates implementation with any coherent optical module. Note, the optical module 10 is presented herein as an example type of optical modules. Those skilled in the art will recognize the systems and method described herein contemplate operation with any type of pluggable optical module, including ones using the CMIS or Coherent CMIS management standards, as well as other modules that support other types of management.

Figure 2:
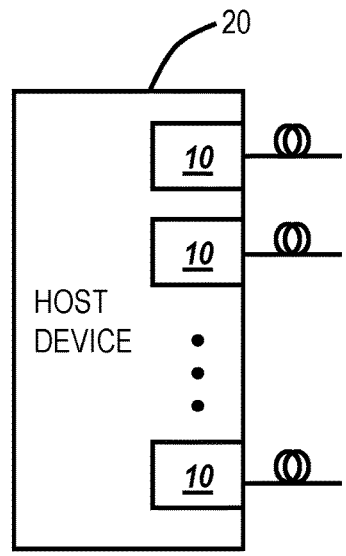
FIG. 2 is a block diagram of a host device with multiple pluggable optical modules included therein.

FIG. 2 is a block diagram of a host device 20 with multiple pluggable optical modules 10 included therein. The host device 20 can include a switch, a router, a Wavelength Division Multiplexing (WDM) terminal, a server, a storage device, and the like. That is, the host device 20 can include any networking, computing, and/or storage device. The pluggable optical modules 10 are used to provide optical interfaces between the host device 20 and an external device, such as a transponder, another switch, router, etc., and the like. Operationally, the host device 20 is configured to receive any compliant pluggable optical module 10.

Again, while shown as "pluggable" optical modules 10, those skilled in the art will recognize the present disclosure is intended for any type of module, including pluggable as well as non-pluggable modules, such as optical subassemblies mounted on a module.

Management

Protocols such as MDIO, I2C, and the like are used for communicating management data between the host device 20 and the module 10. This can include reading and writing data in registers or memory on the module 10. CMIS can include a page in registers or memory for reporting of module's 10 latency, including separate contributions for Tx and Rx paths. Also, custom implementation can include custom register maps include similar reporting registers.

Latency Reporting—Digital Contributions

Again, existing approaches for reporting latency in optical modules focus on the digital contributions of latency, e.g., due to mapping, Forward Error Correction (FEC), FIFOs, and similar digital stages. There have been contributions in standards based on using an enhanced pulse per second (ePPS) to calibrate the propagation delays through the Tx and Rx Digital Signal Processor (DSP) paths. This focuses entirely on the electrical paths. Variations of the optical path, such as from internal EDFA's are not included. Amplified modules have multiple nanoseconds of variation from EDFA's, and meeting this spec required manufacturers to tighten their manufacturing tolerances.

Many modern coherent optical module implementations, especially those based on Silicon Photonics, do not use self-contained optical assemblies. The electro-optical components are integrated into the module, as multiple components. Silicon Photonic devices are often bonded or integrated (Substrate Like PCB (SLP), High Density Build-Up (HDBU)) with the digital Application Specific Integrated Circuity (ASIC) and cannot be measured separately. The optical components such as isolators, amplifiers, and power monitoring taps are often assembled in final stages of module assembly.

Latency Reporting—Optical Contributions

The present disclosure focuses on other techniques using "hooks" integrated in the module, leveraged for accurate latency measurements. The procedure can be performed at final stages of manufacturing containing all optical components.

The present disclosure includes storing latency measurements, for the optical contributions, including the Tx and Rx path, either together or separate. These can also be provided with the digital contributions. An operator, a control plane, a management system, PTP algorithms on a host product, etc. can query these values to determine latency contribution for the module. This can be used in assisting time transfer algorithms and minimize the total time error of the network equipment (NE). By storing calibrated optical delays, and factoring them, we will be able to reduce the timing uncertainty to meet strict Class requirements of certain applications. In the future this will be increasingly important for meeting increasingly tighter timing requirements.

Again, the present disclosure includes
i) Storing of transmit and receive path optical parameters, such as in module non-volatile memory, to be used in computation of module latency reporting values in standard CMIS registers or the like.
ii) Required hooks, that will be incorporated into the module (design) that will facilitate optical measurement delays (during manufacturing process). These hooks are circuitry or the like to perform the measurements.
iii) One (or more) delay measurement procedures (used during manufacturing process) and leveraging the hooks (as in (ii) above) and storing the measured optical delays in the standard registers (as in (i) above).

Processes for Measuring on Module Optical Latency

For measuring, storing, and reporting optical latency, the present disclosure provides two example approaches with a tradeoff of simplicity versus accuracy. These approaches can be introduced in the final stages of manufacturing.

Approach A—Round Trip Delay (Loopback)

Figure 3:
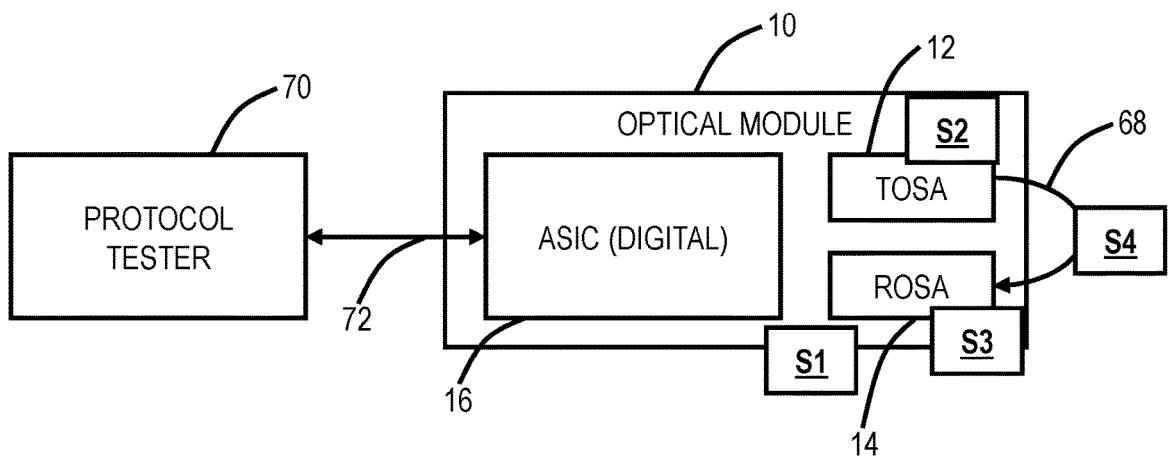
FIG. 3 is a block diagram of a module illustrating a round trip delay measurement.

FIG. 3 is a block diagram of a module 10 illustrating a round trip delay measurement. As described herein, the module 10 can be one of the pluggable optical modules 10 another type of pluggable optical module, an optical subassembly that is integrated with another module in a network element, e.g., mounted on a Printed Circuit Board (PCB), or any implementation of a transceiver, transponder, optical modem, etc.

The module 10 can include an ASIC 16, a TOSA 12, and a ROSA 14. Of course, other embodiments are possible, and this is presented as a high-level functional view. The ASIC 16 can be a single or multiple circuits, e.g., a DSP. The TOSA 12 and ROSA 14 are the electro-optic components for a transmitter and a receiver, respectively.

The approach A is simpler than the approach B (below). The module 10 is tested in isolation, without the need for an external line side test setup (the TOSA 12 is connected to the ROSA 14), i.e., the line side is looped back to itself with a fixed and known fiber length, i.e., fiber 68.

In an embodiment, the approach A includes the digital ASIC, on the line side (step S1) initiating an event on its transmitter (step S2), and then detects the event on its receiver (step S3) (through the loopback (step S4)). The event can be a signal from the protocol layer, for example a Flexible Optical (FlexO)/ZR multiframe, a FlexO reserved field, FEC, etc. The event can also be from the DSP symbols, for example, in the DSP multiframe or DSP padding area. This would be the most precise point within the digital ASIC. The event can also be a test pattern, such as a pseudorandom binary sequence (PRBS). The event is used to detect timing, e.g., optical latency=detection time of the event in the Rx minus detection time of the event in the Tx. The round-trip delay is calculated at the digital ASIC 16 on the line side as the Rx time−Tx time. This is expected to be static since it contains minimal digital processes, and should cover both the TOSA 16 and the ROSA 14.

The delay due to the known fiber length can be subtracted from this value to get an accurate representation of the TOSA+ ROSA optical latency. This can be determined by the fiber length and the speed of light inside the fiber (based on the fiber medium). The bulk of the uncertainty is typically in the TOSA 12, given that it can contain an EDFA which includes a spool of doped fiber.

The approach A has a drawback that the ROSA 14 and TOSA 12 uncertainties are lumped together, and must be estimated to separate them. In an implementation, we have observed that ROSA is ~10% delay and TOSA is ~90% of the measured delay introduced by the optical assembly. Note, there is a need to have the ROSA 14 and TOSA 12 delays separate since in a practical implementation the ROSA 14 and TOSA 12 will be connected to an adjacent module 10, not in a loopback. So, to the optical latency, is the sum of the delay from the ROSA 14 on one end with the delay from the TOSA on the other end 12.

The TOSA 12 and ROSA 14 independent values can be stored in Non-Volatile Memory (NVM) in the module 10.

In another embodiment, with the approach A, a test set 70 can be used to measure round-trip delay as described above, but instead of sourcing the timing event at the line side of the digital ASIC 16, it is sourced and measured by the test set 70. A fiber 72 and the digital portion of the ASIC 16 can be removed from this calibrated value, and the uncertainty of the ASIC 16 will show up in the measurement.

Approach B—Unidirectional Delay

Figure 4:
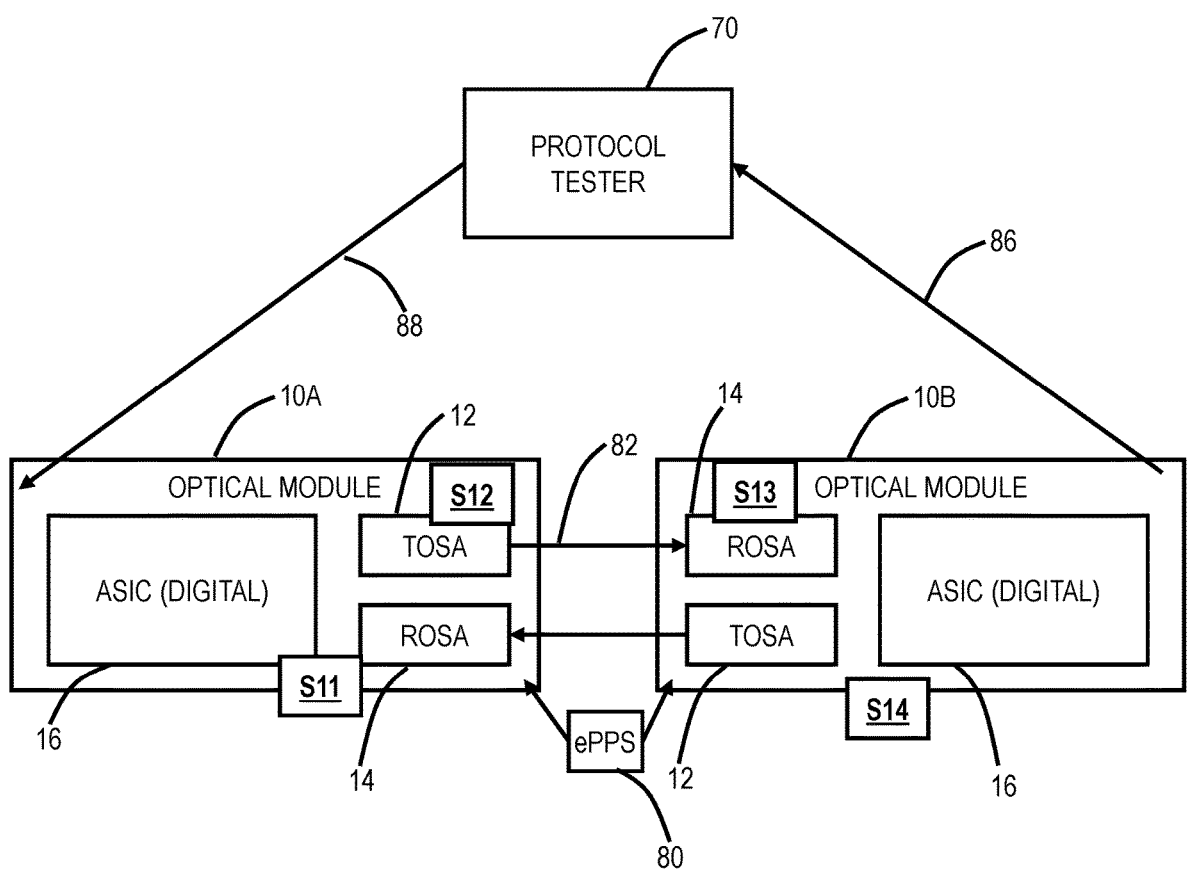
FIG. 4 is a block diagram of modules illustrating a unidirectional delay measurement.

FIG. 4 is a block diagram of modules 10A, 10B illustrating a unidirectional delay measurement. This approach B requires a known good (calibrated) receiver and transmitter in the setup, e.g., an optical module 10A is under test whereas an optical module 10B has known values. The setup will also require a time base (e.g., ePPS signal) sent to both modules 10A, 10B. This is the most accurate of the two disclosed approaches, since TOSA 12 and ROSA 14 can be measured independently.

The digital ASIC 16 for the module 10A under test on the line side (step 11) initiates an event on its transmitter (step 12), and then the event is detected on the receiver (step 13) of the known good optical module 10B (step S14). The events are the same as approach A.

Both modules 10A, 10B share the same concept of time, distributed using an ePPS signal 80 on the module connectors, which is now a standard pin in most module form factor MSAs.

The unidirectional delay is calculated as the Rx time (step 14)–Tx time (step 11). This is expected to be static since it contains minimal digital processes, and should cover both the TOSA 12 in the module 10A and the ROSA 14 of the module 10B. Delays associated with the known fiber length of a fiber 82 and the known ROSA 14 of the module 10B can be subtracted from this value to get an accurate representation of the delay of the TOSA 12 in the module 10A. Note, whichever module 10A, 10B performs this calculation—in either case the Tx time or the Rx time, referenced, has to be made available to the other module for the calculation to be performed by the other module.

The similar and opposite process can be used to measure the ROSA 14 of the module 10A under test. The TOSA 12 and ROSA 14 independent values can be stored in Non-Volatile Memory (NVM) in the module 10A.

In another embodiment, the test set 70 can be used to measure the unidirectional delay as described above, but instead of the source/destination timing events at steps S11, S14, it is sourced and measured by the test set 70. Fibers 86, 88 and the digital portion of the ASICs 16 of both the modules 10A, 10B must be removed from this calibrated value, and the uncertainty of the ASICs 16 will show up in the measurement.

Reporting

In normal module operation, the latency value can be reported, Tx and Rx separately, in the CMIS registers or the like. These values are computed from the dynamic digital values in the ASIC 16 and static optical values computed by the method disclosed above. The industry has recently defined standard registers (Page 15 h CMIS) for modules to report the latency values, but do not specify how to obtain accurate values.

Process

Figure 5:
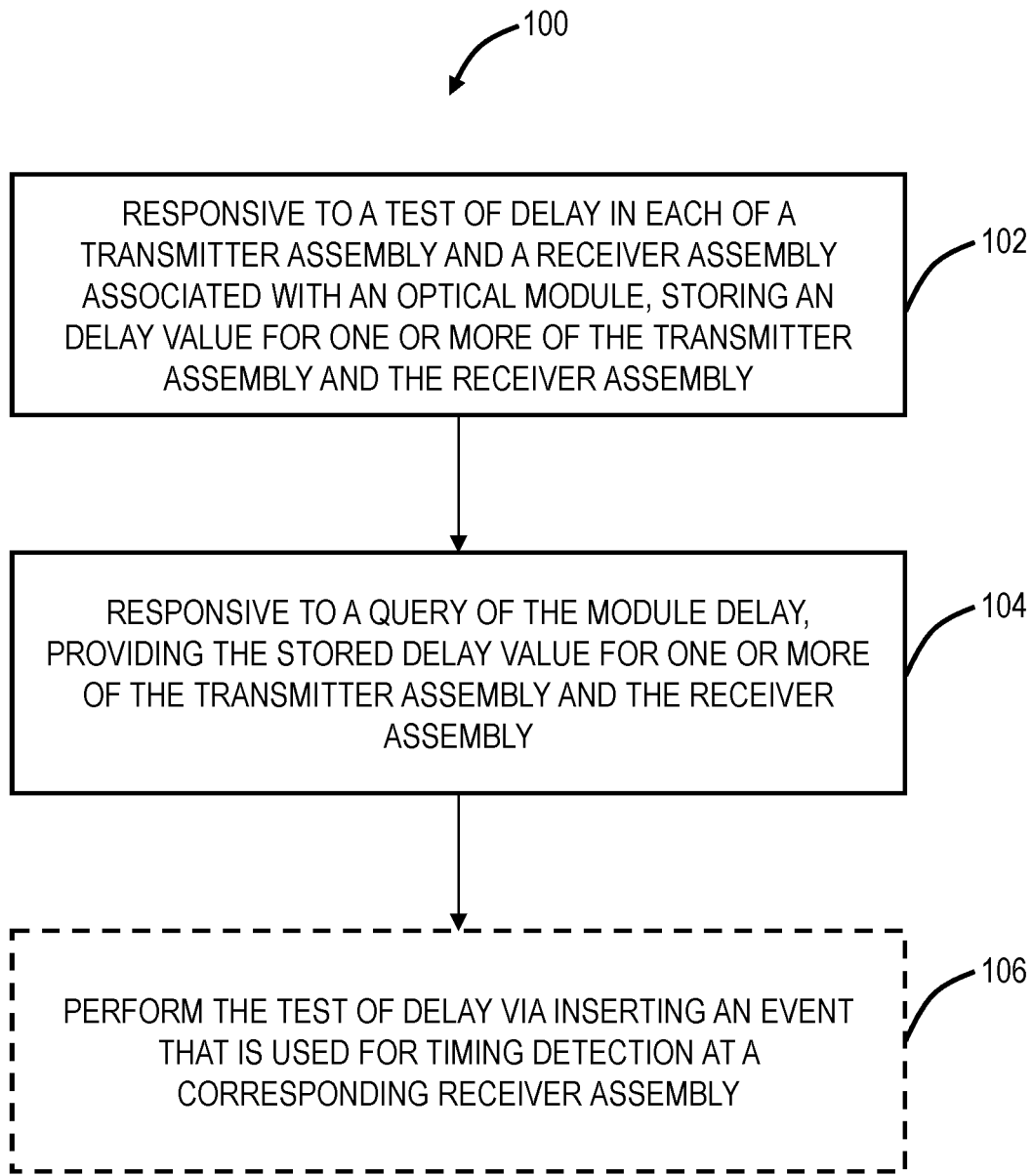
FIG. 5 is a flowchart of a process for optical delay calibration of optical modules.

FIG. 5 is a flowchart of a process 100 for optical delay calibration of optical modules. The process 100 contemplates operation with the modules 10, and the like. The process 100 includes, responsive to a test of delay in each of a transmitter assembly and a receiver assembly associated with an optical module, storing a delay value for one or more of the transmitter assembly and the receiver assembly (step 102); and, responsive to a query of the module delay, providing the stored delay value for one or more of the transmitter assembly and the receiver assembly (step 104). The query can be via a command line, via a management system, etc., and can be used to compute latency on a path, including the optical delay along with digital delay. The expectation is specific modules will have low nanosecond optical delay will be selected for Class B, C, etc. applications.

The process 100 can further include performing the test of delay via inserting an event that is used for timing detection at a corresponding receiver assembly (step 106). The event can be one or more of a Digital Signal Processor (DSP) symbol, a signal in a protocol, and a test pattern.

In an embodiment, e.g., approach A, the corresponding receiver assembly is the receiver assembly in a loopback configuration. The optical delay value for each of the transmitter assembly and the receiver assembly can be determined by separating an overall delay in the loopback configuration.

In another embodiment, e.g., approach B, the corresponding receiver assembly is a receiver assembly in a second optical module having known delay values. The optical module and the other optical module can be synchronized to one another via an embedded pulse per second (ePPS).

In a further embodiment, the test of optical delay can be performed with an external test set.

The optical delay is due to one or more components including splitters, Variable Optical Attenuators (VOAs), Tunable Optical Filters (TOFs), optical amplifiers, e.g., EDFAs, and internal fibers interconnecting the one or more components. The stored optical delay value for each of the transmitter assembly and the receiver assembly can be in registers associated with the circuitry.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. An optical module comprising:
   a transmitter assembly;
   a receiver assembly; and
   circuitry connected to the transmitter assembly and the receiver assembly, wherein the circuitry is configured to
   responsive to a test of delay in each of the transmitter assembly and the receiver assembly, wherein the test of delay includes inserting an event that is used for timing detection at the receiver assembly in a loopback configuration, store a delay value for one or more of the transmitter assembly and the receiver assembly, and
   responsive to a query of the delay, provide the stored delay value for the one or more of the transmitter and the receiver assemblies.

2. The optical module of claim 1, wherein the event is one or more of a Digital Signal Processor (DSP) symbol, a signal in a digital protocol layer, and a test pattern.

3. The optical module of claim 1, wherein the delay value for each of the transmitter assembly and the receiver assembly is determined by separating an overall delay in the loopback configuration based on a predetermined split.

4. The optical module of claim 1, wherein the test of delay is performed with an external test set.

5. The optical module of claim 1, wherein the optical delay is due to one or more components including splitters, Variable Optical Attenuators (VOAs), Tunable Optical Filters (TOFs), optical amplifiers, and internal fibers interconnecting the one or more components.

6. The optical module of claim 1, wherein the stored delay value for each of the transmitter assembly and the receiver assembly is in registers associated with the circuitry.

7. A method comprising steps of:
   responsive to a test of delay in each of a transmitter assembly and a receiver assembly associated with an optical module, wherein the test of delay includes inserting an event that is used for timing detection at the receiver assembly in a loopback configuration, storing a delay value for one or more of the transmitter assembly and the receiver assembly; and
   responsive to a query of the module delay, providing the stored delay value for one or more of the transmitter assembly and the receiver assembly.

8. The method of claim 7, wherein the event is one or more of a Digital Signal Processor (DSP) symbol, a signal in a digital protocol layer, and a test pattern.

9. The method of claim 7, wherein the delay value for each of the transmitter assembly and the receiver assembly is determined by separating a combined delay in the loopback configuration based on a predetermined split.

10. The method of claim 7, wherein the test of delay is performed with an external test set.

11. The method of claim 7, wherein the optical delay is due to one or more components including splitters, Variable Optical Attenuators (VOAs), Tunable Optical Filters (TOFs), optical amplifiers, and internal fibers interconnecting the one or more components.

12. The method of claim 7, wherein the stored delay value for each of the transmitter assembly and the receiver assembly is in registers associated with the circuitry.

* * * * *